United States Patent
Barde et al.

(10) Patent No.: US 11,011,784 B2
(45) Date of Patent: May 18, 2021

(54) METHOD FOR CHARGING A NON-AQUEOUS METAL AIR BATTERY USING CONSTANT CURRENTS OR CONSTANT VOLTAGES, AND CORRESPONDING DEVICE

(71) Applicant: TOYOTA MOTOR EUROPE, Brussels (BE)

(72) Inventors: Fanny Barde, Brussels (BE); Keita Komiyama, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 0 days.

(21) Appl. No.: 16/316,374

(22) PCT Filed: Mar. 21, 2017

(86) PCT No.: PCT/EP2017/056685
§ 371 (c)(1),
(2) Date: Jan. 9, 2019

(87) PCT Pub. No.: WO2018/171867
PCT Pub. Date: Sep. 27, 2018

(65) Prior Publication Data
US 2020/0006817 A1 Jan. 2, 2020

(51) Int. Cl.
*H01M 10/44* (2006.01)
*H01M 12/08* (2006.01)
*H02J 7/04* (2006.01)

(52) U.S. Cl.
CPC ......... *H01M 10/446* (2013.01); *H01M 12/08* (2013.01); *H02J 7/045* (2013.01)

(58) Field of Classification Search
CPC ....... H02J 7/045; H01M 10/466; H01M 12/08
(Continued)

(56) References Cited

U.S. PATENT DOCUMENTS 5,576,608 A 11/1996 Nagai et al.
7,782,011 B2 * 8/2010 Nishida ................. H02J 7/0021
320/112

(Continued)

FOREIGN PATENT DOCUMENTS

KR 20130112315 A 10/2013

OTHER PUBLICATIONS

Written Opinion of the International Searching Authority of PCT/EP2017/056685 dated May 15, 2017.
(Continued)

*Primary Examiner* — Suchin Parihar
(74) *Attorney, Agent, or Firm* — Sughrue Mion, PLLC

(57) ABSTRACT

A method for charging a non-aqueous metal air battery comprising:
if the voltage across the battery is lower than a first threshold voltage, charging (P1) the battery by applying a constant current to the battery having a first value until reaching the first threshold voltage,
if the voltage across the battery is comprised between the first threshold voltage and a second threshold voltage higher than the first threshold voltage, charging (P2) the battery by applying a constant current to the battery having a second value until reaching the second threshold voltage, the second value being lower than the first value,
if the voltage across the battery is higher than the second threshold, charging (P3) the battery by applying to the battery at least one value of constant voltage.

17 Claims, 4 Drawing Sheets

(58) Field of Classification Search
USPC .......................................................... 320/137
See application file for complete search history.

(56) References Cited

U.S. PATENT DOCUMENTS

| | | | |
|---|---|---|---|
| 9,368,979 B2* | 6/2016 | Gong | H02J 7/0014 |
| 2011/0199054 A1 | 8/2011 | Burchardt et al. | |
| 2011/0267009 A1 | 11/2011 | Nakatsuji et al. | |
| 2013/0026976 A1* | 1/2013 | Lu | H02J 7/00711 |
| | | | 320/107 |
| 2016/0087463 A1* | 3/2016 | Loth-Krausser | ............ |
| | | | H02J 7/007194 |
| | | | 320/115 |
| 2016/0097820 A1* | 4/2016 | Thompson | G01R 31/374 |
| | | | 320/134 |

OTHER PUBLICATIONS

International Search Report of PCT/EP2017/056685 dated May 15, 2017.

* cited by examiner

METHOD FOR CHARGING A NON-AQUEOUS METAL AIR BATTERY USING CONSTANT CURRENTS OR CONSTANT VOLTAGES, AND CORRESPONDING DEVICE

CROSS REFERENCE TO RELATED APPLICATIONS

This application is a National Stage of International Application No. PCT/EP2017/056685 filed Mar. 21, 2017.

FIELD OF THE DISCLOSURE

The present disclosure is related to the charge of a non-aqueous metal air battery, for example a battery of a vehicle or of a stationary system.

BACKGROUND OF THE DISCLOSURE

In the present application, the word battery may be directed at a battery pack comprising a plurality of assembled battery cells or also at a battery comprising a single cell.

Also, it should be noted that a non-aqueous metal air battery does not comprise water (or a quantity as small as a few ppm).

An individual battery cell of a non-aqueous metal air battery comprises:

A metal anode (preferentially lithium),
A non-aqueous electrolyte comprising:
  A solvent or a mixture of solvents chosen from the list comprising: ethers based such as 1,2-Dimethoxy-ethane (DME or monoglyme), Glymes (diglyme, triglyme, tetraglyme . . . ), or ionic liquids—such as N,N-diethyl-N-methyl-N-(2-methoxyethyl-ammonium bis(trifluoromethanesulfonyl) amide (DEME-TFSI), N-methyl-N-propylpiperidinium bis(trifluoromethanesulfonyl) amide ($PP_{13}$TFSI),N-butyl-N-methylpyrrolidinium bis(trifluoromethanesulfonyl) amide ($PP_{14}$TFSI), etc., or dimethyl sulfoxide (DMSO), or dimethylacetamide (DMA), etc.
  A salt of metal (preferentially $Li^+$, such as LiTFSI (lithium bis(trifluoromethanesulfonyl) amide), LiFSI, $LiClO_4$, $LiPF_6$, $LiNO_3$, etc.)
  A soluble catalyst, sometimes called redox mediator, such as for example, 2,5-di-tert-butyl-1,4-benzoquinone (DD8Q), tetrathiofulvalene (TTF), tris[4-(diethylamino)phenyl]amine (TDPA), 2,2,6,6-tetramethylpiperidinyloxyl (TEMPO), 2-azaadamantane-N-oxyl (AZADO), phthalocyanine (FePc), 10-methylphenothiazine (MPT), bromide ($Br^-$) and iodide ($I^-$) or $Co(Terp)_2$, quinones, etc.) which may operate by relying on the electro-chemical oxidation of the mediator, which itself in a second step chemically decomposes the $Li_2O_2$.
A porous air cathode (using $O_2$ as the main reactant), comprising an electric conductor (carbon, for example in the form of carbon particles or carbon nanotubes, or a precious metal (Au, etc), or carbon protected or coated by a precious metal such as Au, or nickel or titanium carbide), a binder, and sometimes a solid catalyst (Au, Ru, Mo, $MoC_2$, Cr, $Co_3O_4$, $MnO_2$, etc.).

It is generally considered that the cathode is the support for the following reactions:
1) During the discharge, $O_2$ is consumed to form $Li_2O_x$:

$$2Li+(x/2)O_2 \rightarrow Li_2O_x$$

More precisely, the above reaction occurs in several steps in which the first one corresponds to the formation of $O_2^-$ radicals:

$$O_2+e^- \rightarrow O_2^-$$

2) During the charge, $O_2$ is released:

$$Li_2O_x \rightarrow 2Li+(x/2)O_2$$

However, it should be noted that during the electrochemical processes performed by the battery, side reactions may occur. For example, $O_2^-$ radicals may react with solvent molecules composing the electrolyte and thus form side reactions products such as lithium carbonate ($Li_2CO_3$), lithium formate, or lithium acetate, etc. The electric potential of the battery may thus suddenly increase, which leads to bad rechargeability of the battery, and poor capacity retention.

Most notably, it has been observed that $CO_2$ gas can unwantedly appear during the charge of a battery when the above mentioned voltage increases. This $CO_2$ is detrimental to the battery, participates to the degradation of the battery and shortens the lifetime and capacity performances of the battery for the next battery cycles.

Document KR 20130112315 discloses a method for charging a battery using a constant current. The battery of this document contains water and is not applicable to non-aqueous metal air batteries. Also, the solution disclosed in this document is not satisfying enough.

It is a primary object of the disclosure to provide methods and systems that overcome the deficiencies of the currently available systems and methods.

SUMMARY OF THE DISCLOSURE

The present disclosure overcomes one or more deficiencies of the prior art by proposing a method for charging a non-aqueous metal air battery (for example a battery which has been discharged) comprising:
if the voltage across the battery is lower than a first threshold voltage, charging the battery by applying a constant current to the battery having a first value until reaching the first threshold voltage,
if the voltage across the battery is comprised between the first threshold voltage and a second threshold voltage higher than the first threshold voltage, charging the battery by applying a constant current to the battery having a second value until reaching the second threshold voltage, the second value being lower than the first value,
if the voltage across the battery is higher than the second threshold, charging the battery by applying to the battery at least one value of constant voltage.

Thus, the present disclosure proposes three different charging regions, delimited by the value of the voltage across the battery, and in which different ways of charging are applied.

It has been observed that side reactions which may produce $CO_2$ occur typically when the voltage across the battery is high or during voltage increases.

Charging using a constant current having a high value (the first value) provides a fast charge, and the present disclosure proposes using this charging method when the voltage across the battery is low (lower than the first threshold voltage) because there is less risk to observe sudden voltage increases.

Charging using a constant current having a lower value (the second value) provides a slower charge and the inventors of the present application have observed that this charging method is preferred in the middle of the charge (between the first and the second threshold).

Charging using a constant voltage ensures that no sudden increases of voltage occur which could lead to side reactions and the formation of $CO_2$.

Thus, a fast charge of the battery is obtained with no or limited side reactions appearing, which leads to less battery degradation and extends the lifetime of the battery.

The first current value, the second current value, the first threshold voltage and the second threshold voltage may be obtained during a prior calibration step, for exemble experimentally by measuring the $CO_2$ formed in the battery. This calibration step may be carried out for each battery and each application.

According to an embodiment, the method comprises charging the battery by applying a constant current to the battery having the first value until reaching the first threshold voltage comprises:
(a) determining the difference $\Delta VT1$ between the voltage across the battery and the first threshold voltage,
(b) charging the battery by applying to the battery the constant current having the first value,
(c) determining the voltage elevation $\Delta Vx$ across to battery after a first duration,
(d) if the voltage elevation $\Delta Vx$ is inferior to the previously determined difference $\Delta VT1$, repeating steps (a) to (d).

The first duration may be chosen to ensure that the voltage across the battery does not reach the first threshold voltage in an uncontrollable manner. This first duration may be obtained during a prior calibration step.

According to an embodiment, the method comprises charging the battery by applying a constant current to the battery having the second value until reaching the second threshold voltage comprises:
(e) determining the difference $\Delta VT2$ between the voltage across the battery and the second threshold voltage,
(f) charging the battery by applying to the battery the constant current having the second value,
(g) determining the voltage elevation $\Delta Vy$ across the battery after a second duration,
(h) if the voltage elevation $\Delta Vy$ is inferior to the previously determined difference $\Delta VT2$, repeating steps (e) to (h).

The second duration may be chosen to ensure that the voltage across the battery does not reach the second threshold voltage in an uncontrollable manner. This first duration may be obtained during a prior calibration step.

According to an embodiment, charging the battery by applying to the battery at least one value of constant voltage, if the voltage across the battery is higher than the second threshold (and preferably if the voltage across the battery is below the maximum voltage value applicable to the battery), is performed until the current flowing through the battery reaches a current limit.

It should be noted that the highest constant voltage value which may be applied to the battery is preferably equal to a maximum voltage value applicable to the battery.

The current flowing through a battery charged using a constant voltage generally reaches a maximum value before decreasing to a predetermined current limit denoted in the present disclosure by ilimit which for example is fixed during a prior calibration step. Once ilimit is reached the constant voltage charging step will stop, at least for the value which was applied.

According to an embodiment, charging the battery by applying to the battery at least one value of constant voltage is performed until a battery capacity limit is reached.

According to an embodiment, charging the battery by applying to the battery at least one value of constant voltage comprises charging the battery by applying successively to the battery a plurality of successive constant voltage values, and
the highest constant voltage value being equal to a maximum voltage value applicable to the battery, or
the sum of successive constant voltage elevations (voltage differences between two successive constant voltage values) being lower or equal to the difference between the maximum voltage value applicable to the battery and a voltage value measured after applying constant current having the second value to the battery (denoted Vy2 hereinafter).

It should be noted that in this embodiment, a constant voltage value can be either equal to the preceding constant voltage value or lower than the preceding constant voltage value.

According to an embodiment, charging the battery by applying to the battery at least one value of constant voltage comprises charging the battery by applying a single constant voltage value being equal to a maximum voltage value applicable to the battery.

This maximum voltage value applicable to the battery may be obtained in a calibration step.

The present disclosure also proposes a device for controlling the charge of a non-aqueous metal air battery comprising:
a module configured for applying to the battery a constant current having a first value until reaching a first threshold voltage, if the voltage across the battery is lower than the first threshold voltage,
a module configured applying to the battery a constant current having a second value until reaching a second threshold voltage higher than the first threshold voltage, the second value being lower than the first value, if the voltage across the battery is comprised between the first threshold voltage and the second threshold voltage,
a module configured for applying to the battery at least one value of constant voltage, if the voltage across the battery is higher than the second threshold.

This device may be adapted to perform all the embodiments of the above defined method.

According to an embodiment, the module configured for applying to the battery a constant current having the first value is further configured to:
(a) determine the difference $\Delta VT1$ between the voltage across the battery and the first threshold voltage,
(b) charge the battery by applying to the battery the constant current having the first value,
(c) determine the voltage elevation $\Delta Vx$ across the battery after a first duration,
(d) if the voltage elevation $\Delta Vx$ is inferior to the previously determined difference $\Delta VT1$, repeat steps (a) to (d).

According to an embodiment, the module configured for applying to the battery a constant current having the second value is further configured to:
(e) determine the difference $\Delta VT2$ between the voltage across the battery and the second threshold voltage,
(f) charge the battery by applying to the battery the constant current having the second value,
(g) determine the voltage elevation $\Delta Vy$ across the battery after a second duration,
(h) if the voltage elevation $\Delta Vy$ is inferior to the previously determined difference $\Delta VT2$, repeat steps (e) to (h).

According to an embodiment, the module configured for applying to the battery at least one value of constant voltage, if the voltage across the battery is higher than the second threshold (and preferably if the voltage across the battery is below the maximum voltage value applicable to the battery), is further configured to apply to the battery the at least one value of constant voltage until the current flowing through the battery reaches a current limit.

According to an embodiment, the module configured for applying to the battery at least one value of constant voltage, if the voltage across the battery is higher than the second threshold, is further configured to apply to the battery the at least one value of constant voltage until a battery capacity limit is reached.

According to an embodiment, the module configured for applying to the battery at least one value of constant voltage, if the voltage across the battery is higher than the second threshold, is further configured to apply successively to the battery a plurality of successive constant voltage values, and the highest constant voltage value being equal to a maximum voltage value applicable to the battery, or the sum of successive constant voltage elevations (voltage differences between two successive constant voltage values) being lower or equal to the difference between the maximum voltage value applicable to the battery and a voltage value measured after applying constant current having the second value to the battery (denoted Vy2 hereinafter).

According to an embodiment, the module configured for applying to the battery at least one value of constant voltage, if the voltage across the battery is higher than the second threshold, is further configured to apply a single constant voltage value being equal to a maximum voltage value applicable to the battery.

The disclosure also proposes a vehicle or stationary system comprising the above defined device and a non-aqueous metal air battery controlled by the device.

BRIEF DESCRIPTION OF THE DRAWINGS

How the present invention may be put into effect will now be described by way of example with reference to the appended drawings, in which.

DESCRIPTION OF THE EMBODIMENTS

Reference will now be made in detail to exemplary embodiments of the disclosure, examples of which are illustrated in the accompanying drawings. Whenever possible, the same reference numbers will be used throughout the drawings to refer to the same or like parts.

Figure 1:
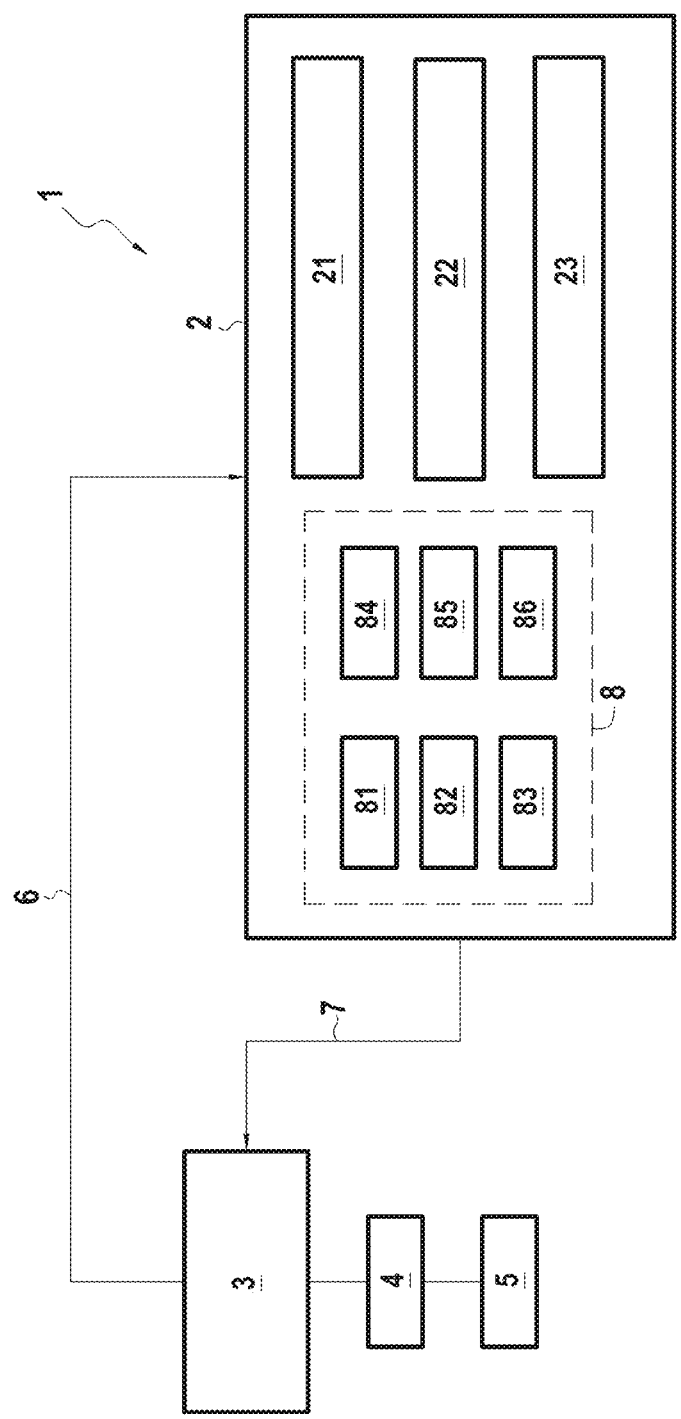
FIG. 1 is a schematic example of elements of a vehicle comprising a device for controlling the charge of a battery.

FIG. 1 is a schematic example of elements of a vehicle 1 comprising a device 2 for controlling the charge of a battery pack (or battery) 3 which is of the non-aqueous metal air type.

The battery 3 provides electrical power to an invertor 4 which provides the necessary currents to an electrical motor 5. It should be noted that for other applications, for example for stationary systems, a similar system may be provided without the inverter 4 and the motor 5.

In order to control the charge of the battery 3, the device 2 for controlling the charge of the battery comprises:

a module 21 configured for applying to the battery a constant current having a first value until reaching a first threshold voltage, if the voltage across the battery is lower than the first threshold voltage, a module 22 configured applying to the battery a constant current having a second value until reaching a second threshold voltage higher than the first threshold voltage, the second value being lower than the first value, if the voltage across the battery is comprised between the first threshold voltage and the second threshold voltage, and a module 23 configured for applying to the battery at least one value of constant voltage, if the voltage across the battery is higher than the second threshold.

The control device 2 may be a computer comprising a processor and a storage. The storage may include any device that stores executable instructions and data. Thus, the storage may be, for example, Random Access Memory (RAM), Electrically-Erasable Programmable, Read-Only Memory (EEPROM), a storage drive, an optical disc, and the like.

The modules 21 to 23 may each be implemented at least partially in the form of computer instructions stored in a storage of the device 2 and executable on a processor of the device 2.

In order for the modules 21 to 23 to perform the control of the charge of the battery, the vehicle 1 composes a communication link 6, which may communicate the value of the voltage across the battery to the device 2.

The vehicle 1 also comprises a control link 7 in order to control battery 3. For example, sub-modules 21 to 23 control the charge of the battery 3 using the control link 7 so as to command or control the battery to be charged using a constant current or a constant voltage.

The device 2 comprises other modules which may be part of an Electronic Control Unit 8 (ECU 8). The ECU 8 may be distinct from the device 2 in alternative embodiments (not shown).

The ECU 8 comprises the following modules:

A module 81 for evaluating the capacity of the battery 3,

A module 82 for setting the first threshold voltage,

A module 83 for setting the second threshold voltage,

A module 84 for calculating a voltage difference between the voltage across the battery and the first voltage threshold, A module 85 for calculating a voltage difference between the voltage across the battery and the second voltage threshold, and A module 86 for setting a maximum voltage value applicable to the battery.

Figure 2:
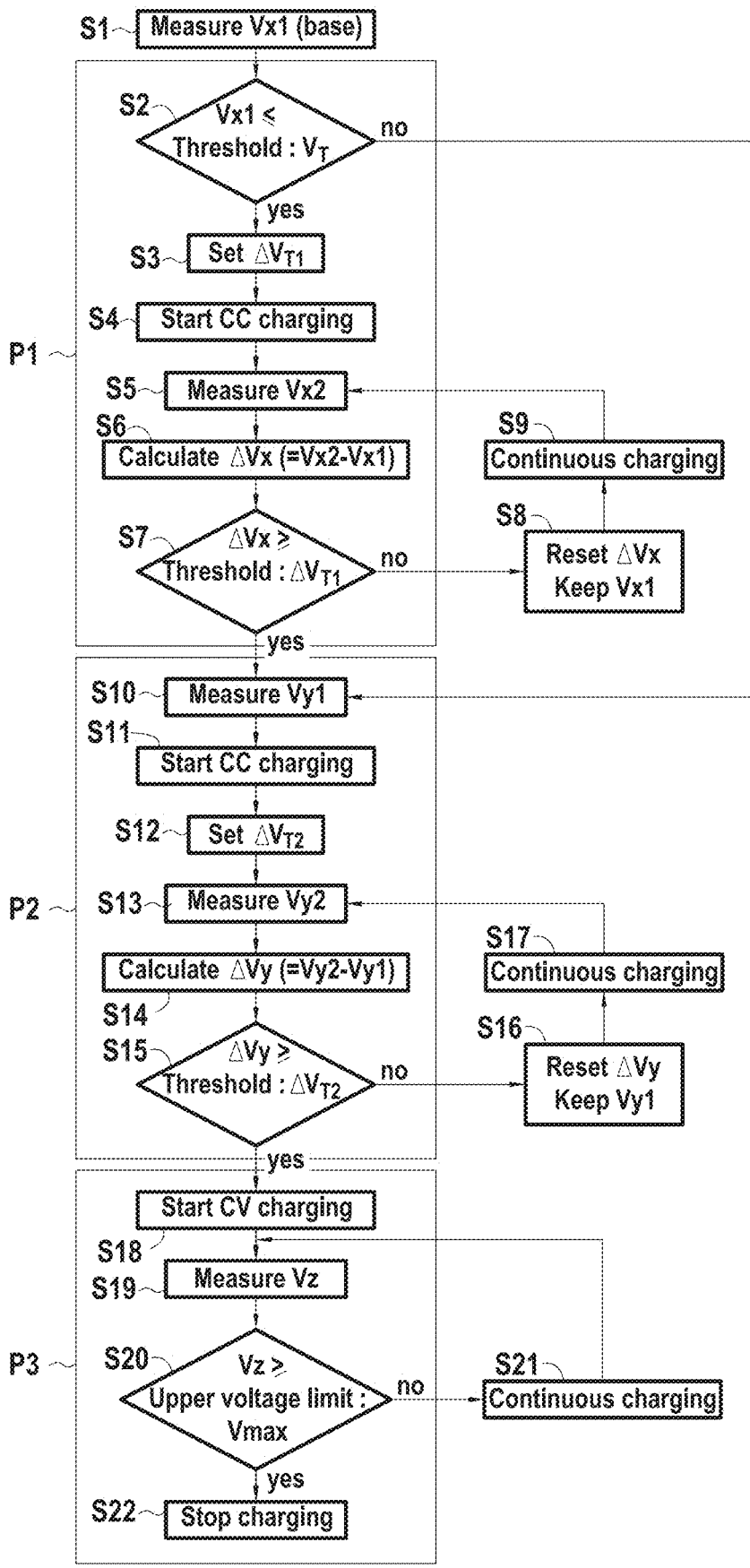
FIG. 2 is a block diagram of an exemplary method for controlling the charge of a battery.

FIG. 2 is a block diagram of an exemplary method for controlling the charge of a battery. This method may be implemented in the vehicle 1 of FIG. 1 using the device 2.

This method comprises three parts. In a first part P1, the voltage across the battery is lower than a first threshold voltage, and the battery is charged by applying a constant current to the battery having a first value until reaching the first threshold voltage. In a second part P2, the voltage across the battery is comprised between the first threshold voltage and a second threshold voltage higher than the first threshold voltage, and the battery is charged by applying a constant current to the battery having a second value until reaching the second threshold voltage, the second value being lower than the first value. In a third part P3, the voltage across the battery is higher than the second threshold, and the battery is charged by applying to the battery at least one value of constant voltage.

The method of FIG. 2 will now be described more precisely.

In a first step S1, the voltage across the battery is measured to obtain a value Vx1.

It should be noted that when the value Vx1 is measured, the open circuit voltage of the battery is measured. The Open Circuit Voltage is known to be correlated to the State of (Dis)Charge of a battery.

There exist different States Of Discharge (SOD) of a battery. A battery can be 100% discharged, and then its potential or open circuit voltage will be around or below 2 Volts for a non-aqueous $Li-O_2$ battery, for example.

A battery may also be partially discharged, and then its open circuit voltage can be anywhere between, for example, 2V and 3V, 3V being typically its Open Circuit Voltage when assembled and in a charged state, in the sense of ready to be discharged (able to provide electrons to the system).

The measurement of Vx1 may indicate that the battery is discharged.

Then, Vx1 is compared with a first threshold voltage VT which has been set prior to performing the method (step S2).

If the voltage Vx1 is lower than VT, then the voltage difference ΔVT1 between the voltage across the battery and the first threshold voltage VT is determined in step S3. The battery is then charged using a high constant current having a first value (step S4).

After a first duration to be determined during calibration and starting from the moment the constant current of step P1 is applied, the voltage across the battery Vx2 is measured in step S5, so as to determine the voltage elevation ΔVx across the battery after the first duration (step S6).

A test is then carried out in step S7 to determine whether the voltage elevation ΔVx is inferior to the previously determined difference ΔVT1. If the voltage elevation ΔVx is inferior to the previously determined difference ΔVT1, steps S5 to S7 are repeated. More precisely, ΔVx is reset (Vx1 is kept) is step S8, and a high constant current having the first value is applied again in step S9 (similar to step S4) before repeating step S5.

If the voltage elevation ΔVx is superior to the previously determined difference ΔVT1, then the second part P2 of the method starts by a measure of the voltage across the battery Vy1 in step S10. Also, if in step S2 it is determined that Vx1 is superior to the threshold voltage VT, then the second part P2 of the method starts by a measure of the voltage across the battery Vy1 in step S10.

After step S10 is carried out, a constant current having a low value (the second value) is applied in step S11.

Then, the difference ΔVT2 between the voltage across the battery Vy1 and the second threshold voltage (noted Vα) is determined in step S12.

After a second duration to be determined during calibration and starting from the moment the constant current of step P2 is applied, the voltage across the battery Vy2 is measured in step S13, and the voltage elevation ΔVy across the battery after the second duration is determined (step S14).

A test is then carried out in step S15 to determine whether the voltage elevation ΔVy is inferior to the previously determined difference ΔVT2. If the voltage elevation ΔVy is inferior to the previously determined difference ΔVT2, steps S13 to S15 are repeated. More precisely, ΔVy is reset (Vy1 is kept) in step S16, and a low constant current having the second value is applied again in step S17 (similar to step S11) before repeating step S13.

If the voltage elevation ΔVy is superior to the previously determined difference ΔVT2, then the third part P3 of the method starts by applying at least one constant voltage value (step S18).

The voltage across the battery Vz is then measured (step S19). A test (step S20) is carried out to determine whether the voltage across the battery Vz is above a maximum voltage value applicable to the battery Vmax, and if yes, the at least one constant voltage value is applied again to the battery (step S21). If Vz is above the maximum voltage value applicable to the battery Vmax, then the charge of the battery is completed and charging stops (step S22).

Figure 3:
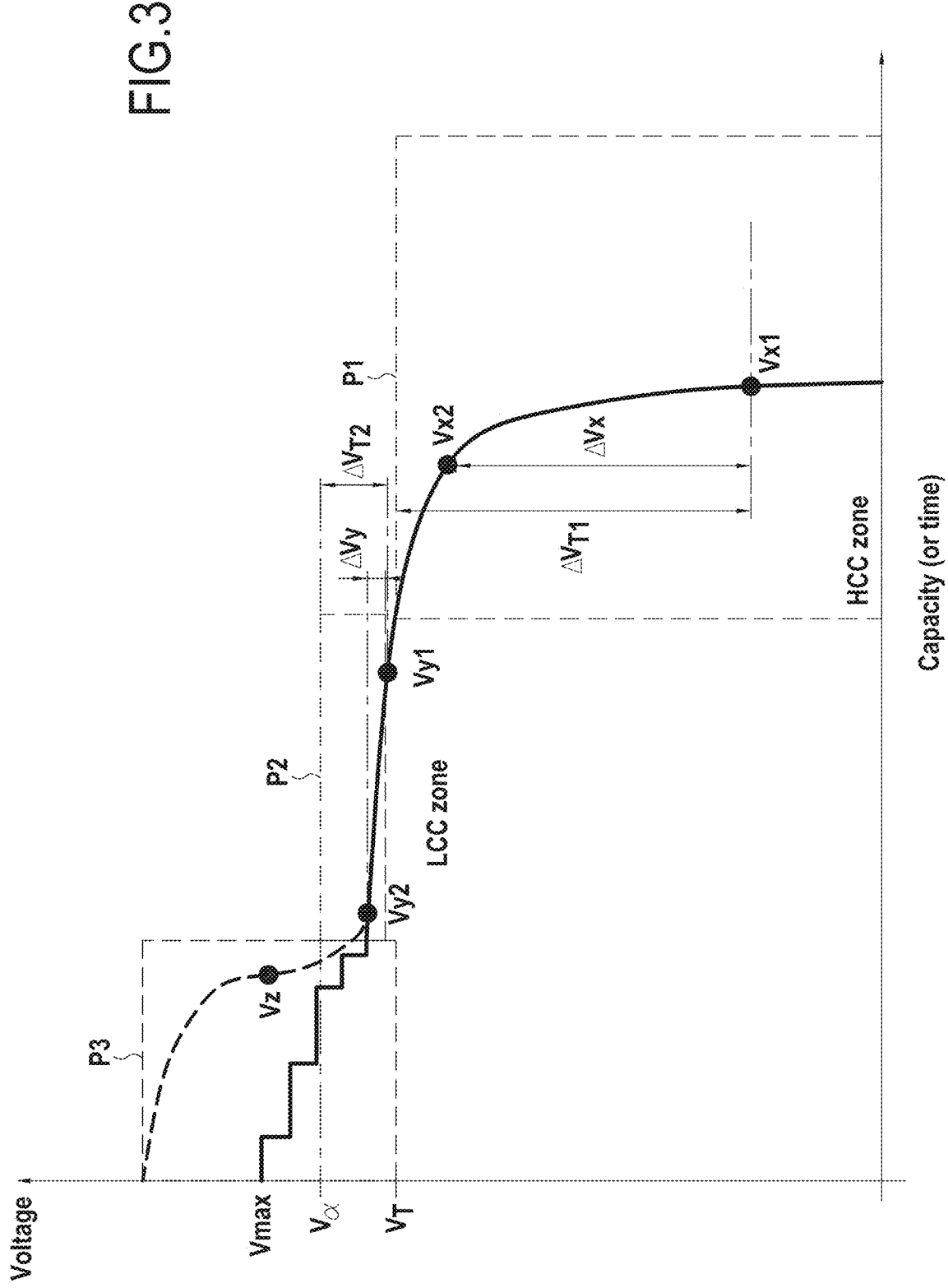
FIG. 3 is a graph of the voltage across the battery against the capacity of the battery.

FIG. 3 is a graph of the voltage across the battery against the capacity of the battery. On this figure, the charge of the battery has been represented from right to left under a representation known to the person skilled in the art, with the capacity (or the time) returning to zero when the battery is charged.

The three parts P1, P2 and P3 of the method described in reference to FIG. 3 are shown on the graph.

In the first part P1, the measure of Vx1 is shown on the graph, and an arrow shows the direction followed during the charging on the curve of FIG. 3. Vx2, ΔVx, ΔVT1 are also shown by way of example on the figure. As can be seen on the figure, a fast charge is obtained.

In the second part P2, a slower charge is achieved. Vy1, Vy2, ΔVy, ΔVT2, and Vα are shown on the figure.

In the third part P3, the voltage is controlled by applying a plurality of constant voltage values, represented using a continuous line. The application of this plurality of constant voltage values corresponds to a plurality of voltage elevations forming steps so as to reach the value Vmax.

In the third part P3, in a dotted line, the charge that would happen using a method according to the prior art in which the voltage increases above Vmax and $CO_2$ appears.

Vz and Vmax are shown on the figure.

Figure 4A:
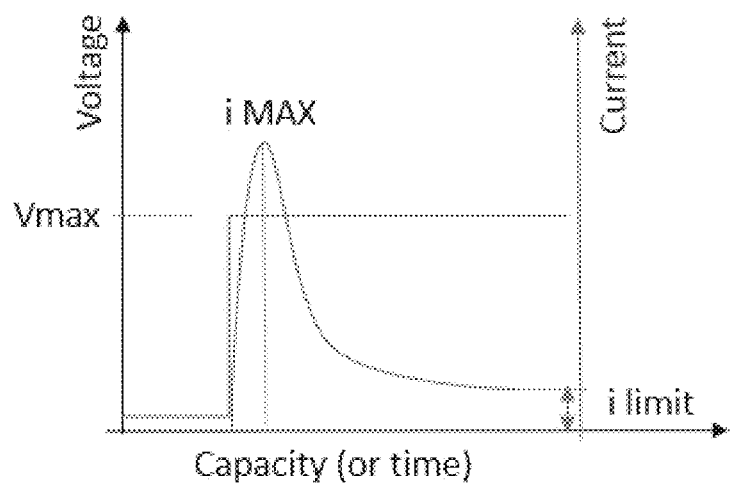
FIG. 4A and FIG. 4B are two graphs showing the evolution of the voltage during the constant voltage charging mode.

FIG. 4A is a graph showing the evolution of the voltage during the constant voltage charging mode. More precisely, FIG. 4A is a graph showing the use of a single constant voltage value applied to the battery which is equal to Vmax, the maximum voltage value applicable to the battery. The current flowing through the battery is also shown on the figure.

As can be seen on the figure, the current reaches a maximum iMAX shortly after the voltage Vmax has been applied. The current then decreases until reaching a value ilimit. When the value ilimit is reached, the charge of the battery is considered to be over.

Figure 4B:
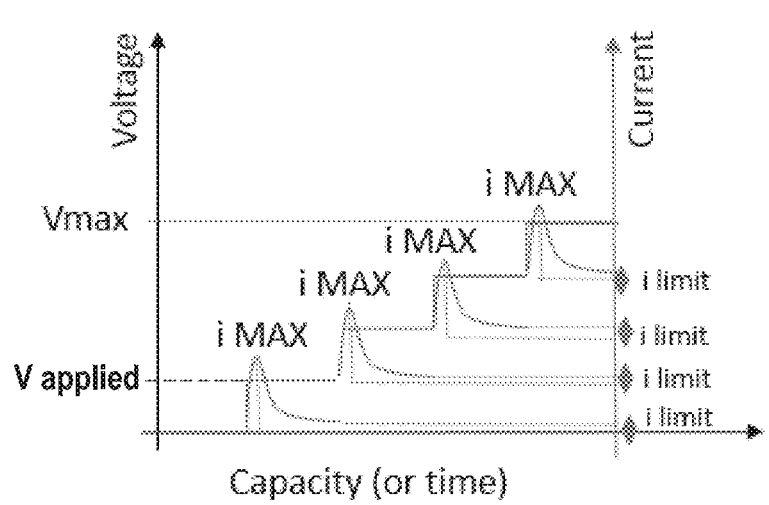

An alternative embodiment is shown on FIG. 4B. In this embodiment, a plurality of successive constant voltage values are applied. The successive constant voltage values correspond to successive voltage elevations from the previous value applied. The highest constant voltage value is equal to the maximum voltage value applicable to the battery Vmax.

On the figure, as an example, there are 4 steps, and four different constant voltage values are applied successively to the battery. Between each step, the voltage may increase of a predetermined value (for example of 500, 250, 100, 50, 20, 10, 5, 2, or 1 mV).

For each step, it is possible to observe an increase of current and a decrease until reaching a value ilimit. It should be noted that ilimit may be calculated as being a fraction of the maximum iMAX corresponding to the voltage step. For example, ilimit may be equal to iMAX divided by 10, 20, 50 or 100. The value of ilimit corresponding to the end of the charge may be obtained during a calibration step carried out before performing the method.

It should be noted that the various first threshold voltage, the second threshold voltage, the maximum voltage value applicable to the battery, the first value of the current, the second value of the current, the at least one constant voltage, the value of ilimit, may each be determined during a calibration step carried out before performing the control method as described above. More precisely, the calibration can be carried out using a $CO_2$ sensor while charging the battery so as to determine the values of each parameters which allow a fast charge without $CO_2$ appearing.

The invention claimed is:

1. A method for charging a non-aqueous metal air battery comprising:
   based on a voltage across the battery being lower than a first threshold voltage, charging the battery by applying a constant current to the battery having a first value until reaching the first threshold voltage;
   based on the voltage across the battery being between the first threshold voltage and a second threshold voltage higher than the first threshold voltage, charging the battery by applying a constant current to the battery having a second value until reaching the second threshold voltage, the second value being lower than the first value; and
   based on the voltage across the battery higher than the second threshold, charging the battery by applying to the battery at least one value of constant voltage.

2. The method of claim 1, wherein charging the battery by applying the constant current to the battery having the first value until reaching the first threshold voltage comprises:
   (a) determining a difference $\Delta VT1$ between the voltage across the battery and the first threshold voltage;
   (b) charging the battery by applying to the battery the constant current having the first value;
   (c) determining a voltage elevation $\Delta Vx$ across the battery after a first duration; and
   (d) based on the voltage elevation $\Delta Vx$ being inferior to the previously determined difference $\Delta VT1$, repeating operations (a) to (d).

3. The method of claim 1, wherein charging the battery by applying the constant current to the battery having the second value until reaching the second threshold voltage comprises:
   (e) determining a difference $\Delta VT2$ between the voltage across the battery and the second threshold voltage;
   (f) charging the battery by applying to the battery the constant current having the second value;
   (g) determining a voltage elevation $\Delta Vy$ across the battery after a second duration, and;
   (h) based on the voltage elevation $\Delta Vy$ being inferior to the previously determined difference $\Delta VT2$, repeating operations (e) to (h).

4. The method of claim 1, wherein, based on the voltage across the battery being higher than the second threshold, the charging the battery by applying to the battery the at least one value of constant voltage is performed until a current flowing through the battery reaches a current limit.

5. The method of claim 1, wherein charging the battery by applying to the battery the at least one value of constant voltage is performed until a battery capacity limit is reached.

6. The method of claim 1, wherein charging the battery by applying to the battery the at least one value of constant voltage comprises charging the battery by applying successively to the battery a plurality of successive constant voltage values, and a highest constant voltage value being equal to a maximum voltage value applicable to the battery, or a sum of successive constant voltage elevations being lower or equal to difference between the maximum voltage value applicable to the battery and a voltage value measured after applying the constant current having the second value to the battery.

7. The method of claim 1, wherein charging the battery by applying to the battery the at least one value of constant voltage comprises charging the battery by applying a single constant voltage value being equal to a maximum voltage value applicable to the battery.

8. A device for controlling a charge of a non-aqueous metal air battery comprising:
   a first module configured to, based on a voltage across the battery being lower than a first threshold voltage, apply to the battery a constant current having a first value until reaching the first threshold;
   a second module configured to, based on the voltage across the battery being between the first threshold voltage and a second threshold voltage, apply to the battery a constant current having a second value until reaching the second threshold voltage higher than the first threshold voltage, the second value being lower than the first value, and
   a third module configured to, based on the voltage across the battery being higher than the second threshold, apply to the battery at least one value of constant voltage.

9. The device according to claim 8, wherein the first module configured to apply to the battery the constant current having the first value is further configured to:
   (a) determine a difference $\Delta VT1$ between the voltage across the battery and the first threshold voltage;
   (b) charge the battery by applying to the battery the constant current having the first value;
   (c) determine a voltage elevation $\Delta Vx$ across the battery after a first duration, and
   (d) based on the voltage elevation $\Delta Vx$ being inferior to the previously determined difference $\Delta VT1$, repeat operations (a) to (d).

10. The device according to claim 8, wherein the second module configured to apply to the battery the constant current having the second value is further configured to:
   (e) determine difference $\Delta VT2$ between the voltage across the battery and the second threshold voltage;
   (f) charge the battery by applying to the battery the constant current having the second value;
   (g) determine a voltage elevation $\Delta Vy$ across the battery after a second duration; and
   (h) based on the voltage elevation $\Delta Vy$ being inferior to the previously determined difference $\Delta VT2$, repeat operations (e) to (h).

11. The device of claim 8, wherein, based on the voltage across the battery being higher than the second threshold, the third module is further configured to apply to the battery the at least one value of constant voltage until a current flowing through the battery reaches a current limit.

12. The device of claim 8, wherein, based on the voltage across the battery is higher than the second threshold, the third module is further configured to apply to the battery the at least one value of constant voltage until a battery capacity limit is reached.

13. The device of claim 8, wherein, based on the voltage across the battery being higher than the second threshold, the third module is further configured to apply successively to the battery a plurality of successively successive increasing constant voltage values, and a highest constant voltage value being equal to a maximum voltage value applicable to the battery, or a sum of successive constant voltage elevations being lower or equal to a difference between the maximum voltage value applicable to the battery and a voltage value measured after applying the constant current having the second value to the battery.

14. The device of claim 8, wherein, based on the voltage across the battery being higher than the second threshold, the third module is further configured to apply a single constant voltage value being equal to a maximum voltage value applicable to the battery.

15. A vehicle or stationary system comprising the device according to claim 8 and a non-aqueous metal air battery controlled by the device.

16. The method of claim 1, wherein the charging the battery by applying to the battery at least one value of constant voltage comprising regulating the voltage to remain at a constant value.

17. The device of claim 8, wherein the third module is further configured to, based on the voltage across the battery being higher than the second threshold, regulate the voltage to remain at a constant value.

* * * * *